US006220200B1

(12) United States Patent
Howard et al.

(10) Patent No.: US 6,220,200 B1
(45) Date of Patent: Apr. 24, 2001

(54) LINE MARKER WITH LOCKING MECHANISM

(75) Inventors: Michael Howard, Beaufort, SC (US); Charles Li, Peachtree City, GA (US)

(73) Assignee: Carsonite International, Early Branch, SC (US)

(*) Notice: Subject to any disclaimer, the term of this patent is extended or adjusted under 35 U.S.C. 154(b) by 0 days.

(21) Appl. No.: 09/205,417

(22) Filed: Dec. 2, 1998

(51) Int. Cl.[7] .................................. G09F 3/00; F16B 7/10
(52) U.S. Cl. .............................................. 116/209; 403/371
(58) Field of Search ................................ 116/209; 40/606; 248/156, 545, 530; 403/370, 371; 52/40, 298, 165, 736.4, 704, 708, 726.3, 726.4, 156, 745.17, 745.18, 745.21, 741.11, 741.14, 741.15

(56) References Cited

U.S. PATENT DOCUMENTS

| | | | | |
|---|---|---|---|---|
| 2,217,978 | * | 10/1940 | Becker | 403/371 |
| 3,003,149 | * | 10/1961 | Grashow | 403/371 |
| 3,037,920 | | 6/1962 | Vixler . | |
| 3,171,666 | * | 3/1965 | Benjamin et al. | 403/371 |
| 3,326,791 | | 6/1967 | Heuze . | |
| 3,477,930 | | 11/1969 | Crites . | |
| 3,515,654 | | 6/1970 | Børdalen et al. . | |
| 3,696,365 | | 10/1972 | Ward . | |
| 4,080,565 | | 3/1978 | Polak et al. . | |
| 4,090,464 | * | 5/1978 | Bishopp et al. | 116/63 R |
| 4,219,807 | | 8/1980 | Speck et al. . | |
| 4,356,444 | | 10/1982 | Saenz, Jr. . | |
| 4,420,382 | | 12/1983 | Riedl . | |
| 4,489,277 | | 12/1984 | Goolsby . | |
| 4,515,669 | | 5/1985 | Dimond et al. . | |
| 4,516,069 | | 5/1985 | Schmanski . | |
| 4,623,277 | * | 11/1986 | Wayne et al. | 403/371 |
| 4,639,677 | | 1/1987 | Goolsby . | |
| 4,674,431 | * | 6/1987 | Cory | 116/63 P |
| 4,806,850 | | 2/1989 | Saumade et al. . | |
| 4,977,851 | * | 12/1990 | Anderson | 116/209 |
| 5,139,634 | | 8/1992 | Carpenter et al. . | |
| 5,178,822 | | 1/1993 | Buford, III et al. . | |
| 5,340,455 | | 8/1994 | Kroon et al. . | |
| 5,370,783 | | 12/1994 | Carlson et al. . | |
| 5,415,745 | | 5/1995 | Pultan et al. . | |
| 5,469,048 | | 11/1995 | Donohue . | |
| 5,571,229 | * | 11/1996 | Fitzsimmons et al. | 248/156 |
| 5,596,267 | | 1/1997 | Lara et al. . | |
| 5,927,892 | * | 7/1999 | Teh-Tsung | 403/371 |

* cited by examiner

*Primary Examiner*—Andrew H. Hirshfeld
(74) *Attorney, Agent, or Firm*—Thorpe, North & Western, LLP

(57) ABSTRACT

A line marker apparatus for visibly marking the location of a utility line and the like has a tube disposed vertically in the ground. A locking ring is disposed on the tube and has a plurality of locking fingers extending from the ring. The locking finger are bendable in towards the tube. A cap or marker is removably coupled to the locking ring. The cap has an open end for receiving the locking ring and a protrusion extending into contact with the locking finger for forcing the locking finger in towards the tube. Ribs may be formed on an inner surface of the fingers to prevent the locking ring from rotating on the tube. A slot may be formed in the locking ring or cap to vent the cap. An indentation may be formed in the cap to receive indicia.

21 Claims, 4 Drawing Sheets

LINE MARKER WITH LOCKING MECHANISM

BACKGROUND OF THE INVENTION

1. Field of the Invention

The present invention relates to line markers for marking the location of utility lines and the like. More particularly, the present invention relates to a line marker having a locking mechanism for removably securing a line marker to a post or tube.

2. Prior Art

Thousands of miles of buried utility lines form part of the infrastructure connecting communities and utility services around the world. Such utility lines include gas and oil lines, power lines, electrical and/or fiber optic telecommunication and/or cable television lines, water lines, sewer lines, and the like. In is often desirable and necessary to mark the location of these lines to assist utility workers in maintaining the lines and prevent inadvertent disturbance of the lines. Line markers are often used to identify the location of the buried lines and are located above or near ground level. The markers usually have indicia, such as writing, to indicate the type of line being marked. The markers may also contain some type of warning concerning the buried line.

In addition, some markers may double as cathodic protection test stations. Thus, the marker, or similar structure, may contain electrical wires that extend between the utility line and the marker, where they may be accessed by utility workers. The wires may be used to monitor the utility line, such as with cathodic protection It is desirable that the markers be highly visible so that they may be readily located by utility workers and immediately observably by others. It is also desirable that the markers be durable to resist environmental conditions. Because of the number of markers required to mark long lengths of utility lines, it is desirable that the markers be inexpensive and readily available.

One disadvantage with some markers is their use of custom shaped markers which require specially shaped posts and marker members. For example, some markers employ markers with square cross sections requiring posts with square cross sections. Because many of the markers are located in remote areas, it is desirable that they be resistant to vandalism and abuse, such as theft or gun shots. Another disadvantage with some markers is their succeptability to molestation. For example, some markers are easily destroyed by bullets or are easily removed. Therefore, it would be advantageous to develop a line marker which is highly visible and meets the many diverse requirements for identifying, protecting, and monitoring underground utility lines.

OBJECTS AND SUMMARY OF THE INVENTION

It is therefore an object of the present invention to provide a line marker which is highly visible.

It is another object of the present invention to provide a line marker which is resistant to adverse whether conditions.

It is a further object of the present invention to provide a line marker which is resistant to vandalism and other abuse.

It is a further object of the present invention to provide a line marker which discourages unauthorized removal.

It is a further object of the present invention to provide a line marker which may contain a cathodic protection circuit.

These and other objects and advantages of the present invention are realized in a line marker apparatus having a locking ring and cap marker disposed on a support tube. The tube is an elongated tubular member having a first end configured for insertion into the ground, a second end configured for extending upwardly, and a tube wall having an outer or exterior surface and an annular cross-section. The locking ring is disposed on the exterior surface of the second end of the tube and includes at least one locking finger extending from the ring. The locking finger is preferably bendable inwardly from the ring and towards a longitudinal axis of the tube.

The cap is removably coupled to the locking ring and has a cap wall defining a contained hollow volume and an open end for receiving the locking ring. The cap advantageously has a protrusion extending into the hollow of the cap for contacting the locking finger and forcing the locking finger towards the longitudinal axis, and thus the tube. The locking ring advantageously is completely received within the cap, thus concealing how the cap is attached and discouraging tampering or unauthorized removal by vandals. The cap wall also has an outer surface and may have an indentation formed in the outer surface of the wall for receiving indicia. This indicia may include safety warnings or processing information. A transparent window also may be disposed in the indentation for protecting the indicia.

The locking ring also has a top edge and a bottom edge. The wall of the locking ring may have a slot formed therein extending between the top edge and the bottom edge to vent the hollow of the cap. Alternatively, the cap wall may have a slot formed therein extending as a vent to the hollow The at least one finger has an upper end opposite the ring with an edge for digging into a surface, such as an outer surface of the tube. The at least one finger also has an inner surface and at least one rib advantageously is formed on the inner surface of the finger to prevent the ring from rotating on the tube.

The locking ring has an outer surface and may have threads formed thereon. The cap also has an inner surface and may have threads formed thereon which engage the threads of the locking ring. The cap is rotatable about the longitudinal axis with respect to the locking ring. As the cap rotates on the locking ring the cap advances and retracts on the locking ring along the threads Preferably, a plurality of resilient locking fingers are provided and extend from the ring wall generally parallel to the longitudinal axis. Each locking finger has an outer surface. The cap is preferably elongated and also has an inner surface defining a hollow therein. The annular protrusion extends into the hollow of the cap member and contacts the outer surface of the locking fingers for forcing the locking fingers in towards the longitudinal axis As the cap rotates on the locking ring and advances and retracts, the annular protrusion advances and retracts along the length of the fingers to bend the fingers in towards the longitudinal axis, and into binding contact with the outer surface of the tubular member These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention.

Figure 1:
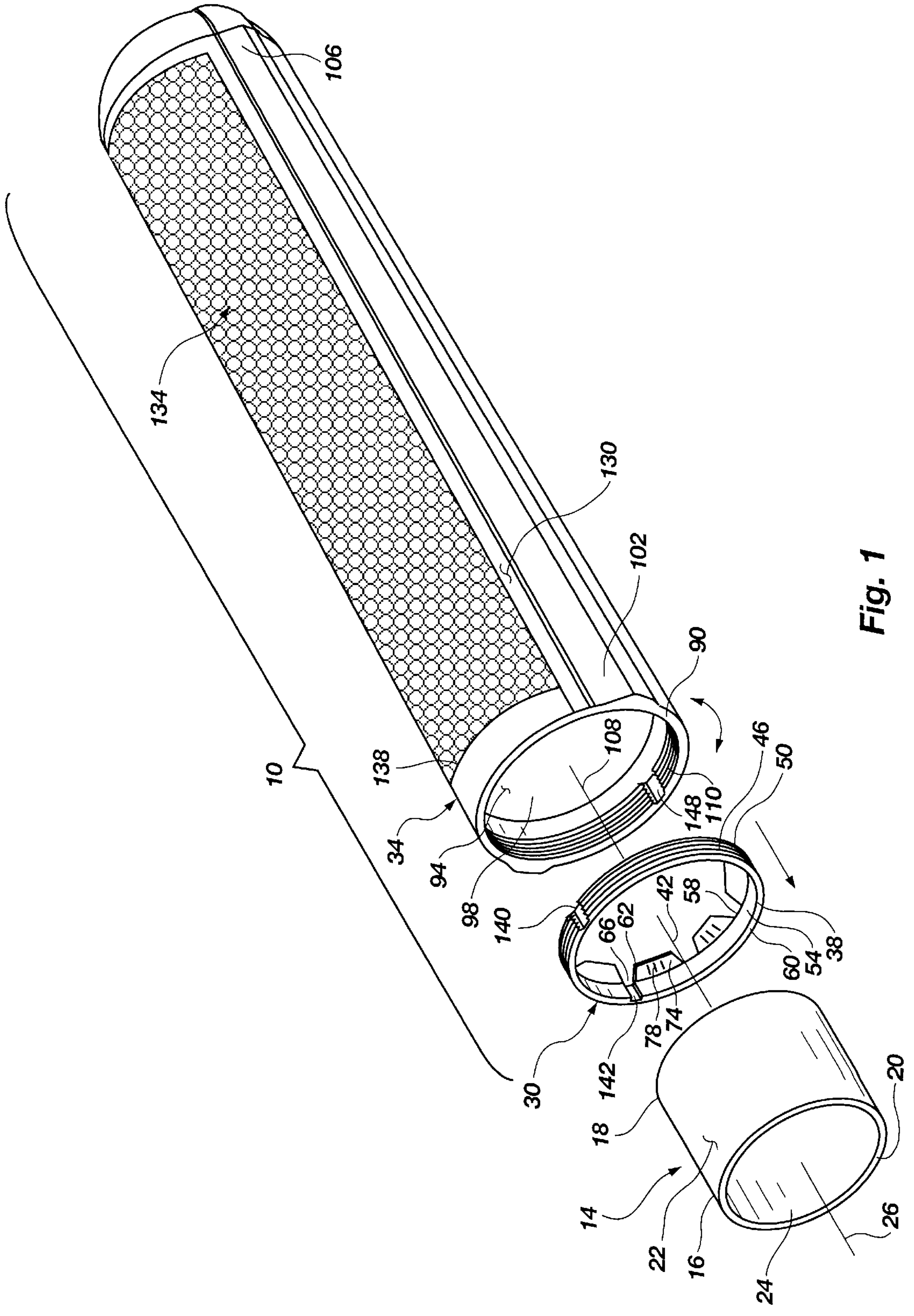
FIG. 1 is an exploded view of a preferred embodiment of a line marker apparatus of the present invention with a tube.
Figure 2:
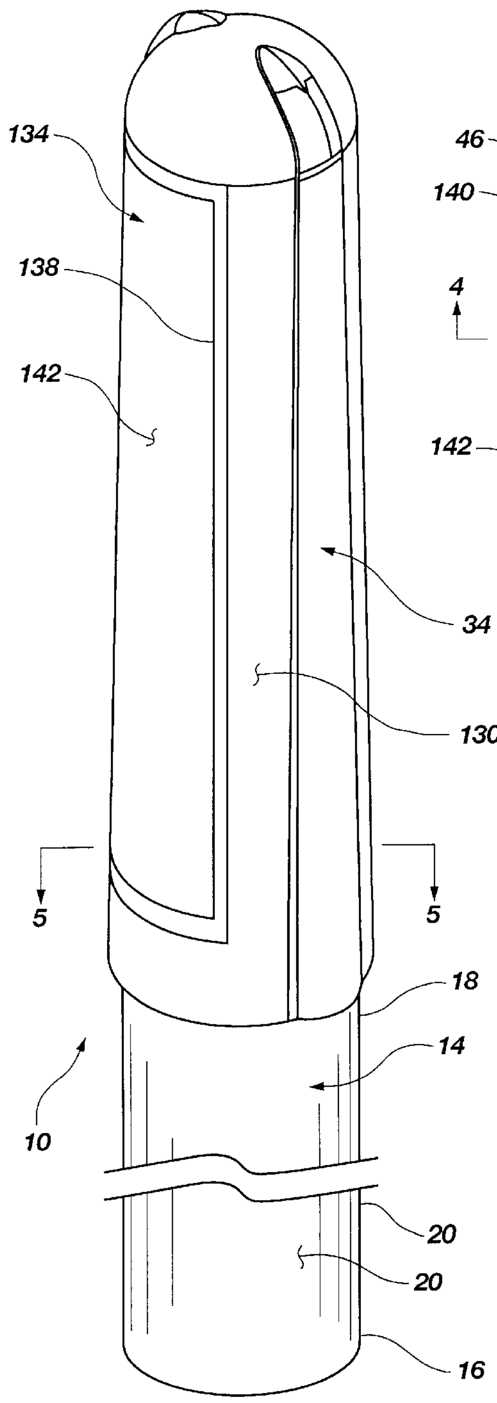
FIG. 2 is a perspective view of the preferred embodiment of the line marker apparatus of the present invention disposed on the tube.

As illustrated in FIGS. 1 and 2, a line marker apparatus, indicated generally at 10, is shown in combination with a support tube or post 14 The line marker apparatus 10 of the present invention will be described with particular reference for use in marking utility lines, although it is to be understood that the apparatus may be used in marking any desired object, and also may be suited for additional uses, such as cathodic protection test stations. Such utility lines include, for example, gas and oil lines, power lines, electrical and/or fiber optic communication and/or cable television lines, water lines, fewer lines , and the like.

The tube or post 14 is an elongated tubular member with a tube wall 20 The tube wall preferably has an annular cross-section and an outer or exterior surface 22 defining a hollow passage 24 extending through the tube 14. A first end 16 of the tube 14 is configured for insertion into the ground while a second end 18, or upper end, of the tube 14 is configured for extending upwardly A longitudinal axis 26 extends through a center of the tube or post 14 which is oriented generally vertical.

The tube 14 is preferably a standard size tube which is readily available. For example, the outer diameter of the tube 14 may be 3.5 inches, or standard 3½ inch tubing. The length of the tube 14 may be any desired length, but is generally 4 to 6 feet long. In additions the tube 14 is buried in the ground at a desired depth so that the upper end 18 of the tube 14 protrudes vertically from the ground to a desired height. Furthermore, the tube 14 may be made of any desired material, such as plastic or metal, and thus may be plastic tubing or metal pipe. The standard size of the tube 14 insures that there will be adequate supplies of posts for use in marking long lengths of utility line and that the tubes will be easy to obtain for repair or replacement.

Referring to FIG. 1, the line marker apparatus 10 of the present invention includes a locking ring 30, or annular member, and a cap 34, cap marker, or marker member. The locking ring 30 advantageously locks or maintains the locking ring 30 and cap 34 on the tube 14.

Figure 5:
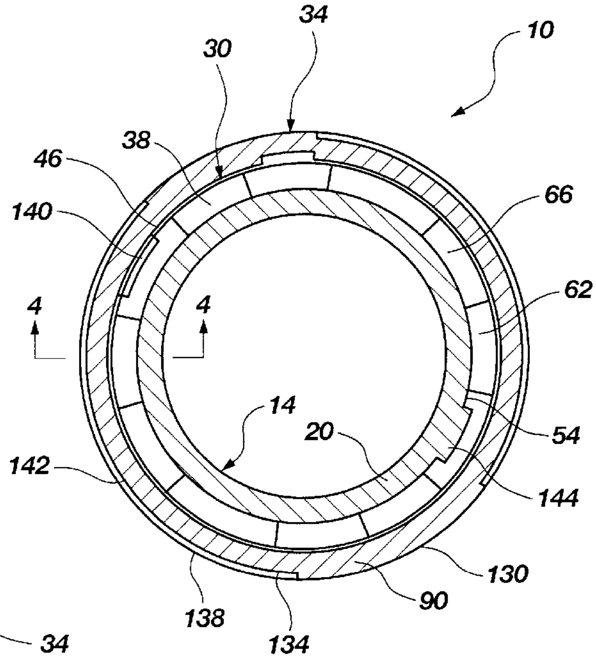
FIG. 5 is a cross sectional view of the preferred embodiment of the line marker apparatus of the present invention disposed on the tube, taken along line 5—5 of FIG. 2.
Figure 4:
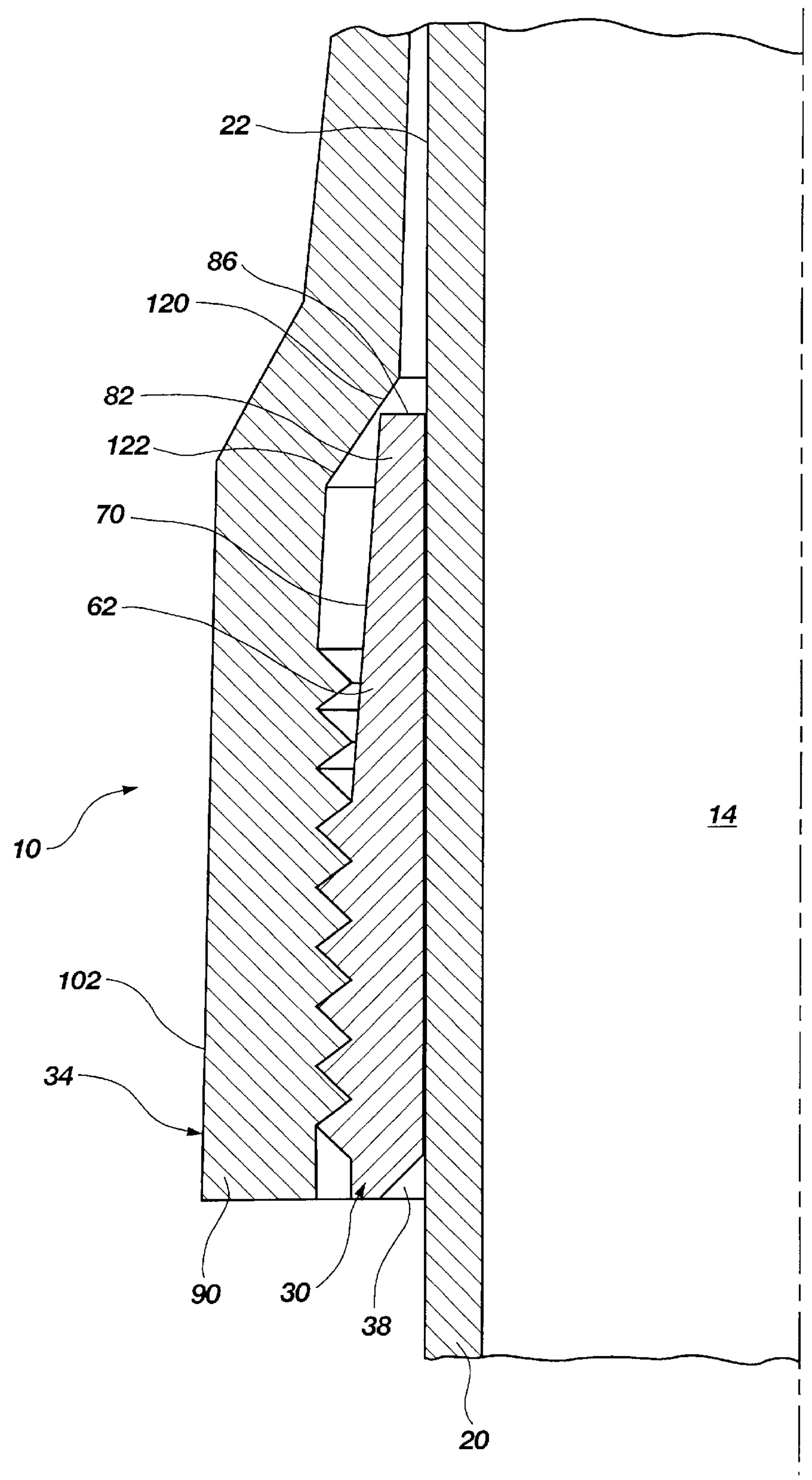
FIG. 4 is a partial cross sectional view of the preferred embodiment of the line marker apparatus of the present invention disposed on the tube, taken along line 4—4 of FIG. 5.

The locking ring 30 may be removably disposed on the exterior surface of the second or upper end 18 of the tube 14, as shown in FIG. 4. The locking ring 30 is a cylindrical or annular member with a ring wall 38. The ring wall has an annular cross-section, as shown in FIG. 5. A longitudinal axis 42 extends through a center of the locking ring 30; and may be coaxial with the longitudinal axis 26 of the tube 14 when the locking ring 30 is disposed on the tube 14. Screw threads 50 are formed on an outer surface 46 of the ring 30. An inner surface 54 of the ring 30 contacts the outer surface 22 of the tube 14 when the locking ring 30 is disposed on the tube 14, as shown in FIG. 4. The locking ring 30 also has a top edge 58, or second end; and a bottom edge 60, or first end.

The inner diameter of the locking ring 30 or ring wall 38 is sized to receive the tube 14. Preferably the inner diameter is sized to snugly fit over the tube 14. Thus, the inner diameter of the locking ring 30 may be substantially the same as an outer diameter of the tube 14, or 3.5 inches or greater. The inner diameter, however, may be sized to slide more freely over the tube 14. Thus, the inner diameter of the ring 30 may be sized slightly larger than the outer diameter of the tube 14. A slightly larger inner diameter allows for dimensional tolerances in the outer diameter of the tube 14 and the inner diameter of the ring 30, and for dimensional variations due to temperature.

A plurality of locking fingers 62 advantageously are formed on the locking ring 30 for locking or maintaining the locking ring 30 on the tube 14. The locking fingers 62 extend from the top edge 58 of the ring wall 38 generally within the cylindrical profile of the ring wall 38, and toward the second end 18 of the tube 14 when the locking ring is disposed on the tube, as shown in FIG. 4. In addition, the fingers 62 extend vertically, and generally parallel to the longitudinal axis 42. The fingers 62 may be extensions of the ring wall 38, or formed by a plurality of gaps or spaces 66 in the ring wall 38 between each finger 62.

Figure 3:
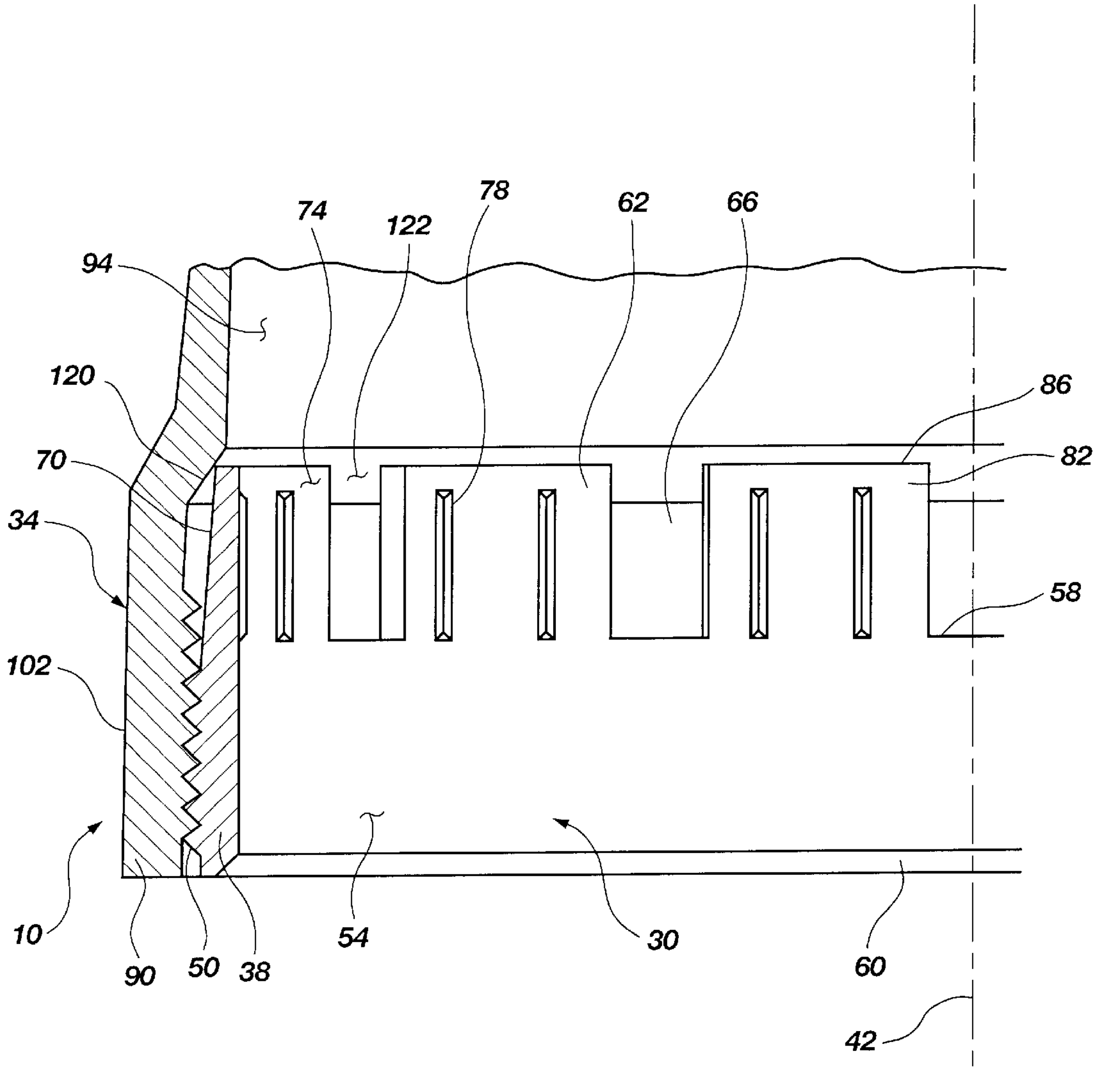
FIG. 3 is a partial cross sectional view of the preferred embodiment of the line marker apparatus of the present invention taken along line 4—4 of FIG. 5, with the tube removed.

Each locking finger 62 has an outer surface 70, as shown in FIGS. 3, and an inner surface 74. The inner surface 74 of the fingers 62 contacts the outer surface 22 of the tube 14 when the locking ring 30 is disposed on the tube 14, as shown in FIG. 4. The fingers 62 are preferably somewhat flexible and resilient. In addition, the fingers 62 are preferably bendable into binding contact with the tube 14, or outer surface 22 of the tube 14, to hold the locking ring 30 on the tube 14.

In addition, one or more ribs 78 advantageously are formed on each locking finger 62, as shown in FIGS. 1 and 3, for preventing rotation of the ring 30 with respect to the tube 14 when the ring 30 is disposed on the tube 14, as shown in FIG. 4. The ribs 78 are formed on the inner surface 74 of the fingers 62 and are generally parallel with the longitudinal axis 42. The ribs 78 engage the outer surface 22 of the tube 14 and prevent or hinder the ring 30 from rotating on the tube 14. Preferably, at least one locking finger 62 has at least one rib 78. Most preferably, each locking finger 62 has one or more ribs 78.

Referring to FIG. 4, each locking finger 62 has an upper end 82, or second end, opposite the ring wall 38. An interior edge 86 advantageously is formed on each locking finger 62 for digging into the outer surface 22 of the tube 14 to prevent removal of the ring 30. The edge 86 preferably forms a sharp angle, or is a sharp edge. Preferably, at least one locking finger 62 has a sharp edge 86. More preferably, each locking finger 62 has a sharp edge 86.

The locking ring 30 may be a unitary member formed from a single piece of material, such as plastic. For example, the locking ring 30 may be formed of plastic by injection molding.

Referring again to FIG. 1, the cap or cap member 34 provides the line marker function for drawing attention to the location of the buried utility line and indicating the type of line. Thus, the size and color of the cap 34 are designed to draw attention to the cap and convey appropriate information. Preferably the cap 34 is elongated to provide a sufficiently visible surface. For example, the length of the cap 34 may be approximately 18 inches. In addition, the shape of the cap 34 is configured to be visible for many or all directions. Preferably the shape of the cap 34 is substantially circular or cylindrical to present a visible and/or reflective surface from all directions.

The cap 34 has a tubular cap wall 90 with a generally annular cross section or that is generally cylindrical, as shown in FIG. 5. The cap wall 90 has an inner surface 94 and defines a hollow 98 therethrough. A first end 102, or lower end, of the cap 34 is open while a second end 106, or upper end, of the cap 34 is preferably enclosed. The open first end 102 receives the tube 14 and locking ring 30, as discussed below. The enclosed second end 106 protects the locking ring 30 and hollow 98 from adverse elements, such as rain. The cap 34 may by partially conical and tapper slightly from the first end 102 to the second end 106. A longitudinal axis 108 extends through a center of the cap 34.

Screw threads 110 are formed on the inner surface 94 of the cap wall 90 at the first end 102 and threadedly engage the threads 50 of the locking ring 30. Thus, the cap 34 may be removably coupled to the locking ring 30 by rotating the cap 34 with respect to the locking ring 30, or rotating the locking ring 30 with respect to the cap 34. In addition, the cap 34 may be removably disposed on the second end 18 of the tube 14 when the locking ring 30 is disposed on the tube 14, as shown in FIG. 4. Thus, the cap 34 and ring 30 rotate with respect to one another and rotate about the longitudinal axis 42 and/or 108.

Referring to FIGS. 3 and 4, the cap 34 advantageously has an annular protrusion 120 formed on the inner surface 94 of the cap wall 90. The annular protrusion 120 extends into the hollow 98 of the cap 34 towards the locking ring 30 or locking fingers 62 when the cap 34 threadedly engages the locking ring 30, or when the locking ring 30 is disposed in the cap 34. The annular protrusion 120 advantageously contacts the outer surface 70 of the locking fingers 62 for forcing the locking fingers 62 into contact with the outer surface 22 of the tube 14, as shown in FIG. 4.

The annular protrusion 120 is formed in the cap wall 38 and has an angled or tapered surface 122 which is angled with respect to the longitudinal axis 108. The protrusion 120 or angled surface 122 is formed by the inner surface 94 of the cap wall 38 tapering inwardly from the first end 102 to the second end 106. The protrusion 120 may be formed by a change in diameter of the cap wall 38. The protrusion 120 reduces the inner diameter of the cap 34 or cap wall 38. The inner diameter of the protrusion 120 nearer the first end 102, or the beginning of the angled surface 122, is preferably larger than the outer diameter of the locking ring 30 or ring wall 38, or the outer diameter at the upper end 82 of the fingers 62. The inner diameter of the protrusion 120 nearer the second end 106, or at an end of the angled surface 122, is preferably less than the outer diameter of the locking ring, or the outer diameter at the upper end 82 of the fingers 62. Thus, the upper end 82 of the fingers 62 contacts the angled surface 122 of the protrusion 120 and the angled surface 122 tends to bend the fingers 62 inwardly or towards the longitudinal axis 108 and/or 42 and the tube 14.

As indicated above, the cap 34 is rotatable about the longitudinal axis 108 and/or 42 with respect to the locking ring 34 and tubular member 14 As the cap 34 is rotated with respect to the locking ring 30, the threads 50 and 110 advance or retract the cap 34 on the locking ring 30. As the cap 34 advances or retracts, the annular protrusion 120 also advances and retracts along the length of the fingers 62. As indicated above, the upper end 82 of the fingers 62 encounters the angled or tapered surface 122 of the protrusion 120 Thus, as the cap 34 is advanced on the locking ring 30, or the locking ring is received into the cap 34, the angled surface 122 tends to force or bend the fingers 62 into binding contact with the outer surface 22 of the tube 14.

The cap 34 also may be a unitary member formed from a single piece of material, such as plastic. For example, the cap 34 may be formed of plastic, such as Lexan, by injection molding.

The method of using the line marker apparatus 10 of the present invention includes mounting the tube or post 14 in the ground such that the second or upper end 18 of the tube 14, and thus the cap 34, is located at a desired height, usually with the cap 34 at eye level. The tube 14 may be inserted into a hole dug to the desired level or may be driven into the ground to the desired level.

The locking ring 30 is disposed on the upper end 18 of the tube 14 with the upper end 18 inserted into or received within the ring 30 As discussed above, the inner diameter of the ring 30 and/or the ribs 78 preferably is sized to snugly fit the outer diameter of the tube 14. The ribs 78 preferably engage the outer surface 22 of the tube 14 to hold the ring 30 vertically on the tube 14. As discussed above, the fingers 62 are resilient and flexible. Thus, the inner diameter of the ribs 78 may be slightly less than the outer diameter of the tube 14 so that the fingers 62 must bend slightly outwardly away from the tube 14 as the ring 30 is inserted over the tube 14 The resilient or spring-like nature of the fingers 62 advantageously biases the ribs 78 or inner surface 74 of the fingers 62 against the outer surface 22 of the tube 14, thus maintaining the ring 30 vertically on the tube 14. The ribs 78 also advantageously prevent the ring 30 from rotating on the tube 14.

The cap 34 is disposed over the locking ring 30 and the second end 18 of the tube 14 with the locking ring 30 and the second end 18 of the tube 14 inserted into or received within the open first end 102 of the cap 34. The cap 34 is rotated about the longitudinal axis with respect to the locking ring 30 and tube 14 such that the threads 110 of the cap 34 engage the threads 50 of the locking ring 30 and advance the ring 30 into the cap 34. The ribs 78 engaging the tube 14 prevent the cap 34 from rotating the ring 30. As the cap 34 advances with respect to the ring 30, the fingers 62 advance with respect to the protrusion 120 and abut the protrusion 120. The protrusion 120 or angled surface 122 advantageously forces or compresses the inner surface 74 of the fingers 62 against the outer surface 22 of the tube 14. In addition, the protrusion 120 advantageously may force the edge 86 of the upper end 82 of the fingers 62 into the outer surface 22 or tube wall 20. Thus, the fingers 62 bear against the tube 14.

Therefore, the fingers 62 bearing against the outer surface 22 of the tube under the force of the protrusion 120 advantageously prevent the line marker apparatus 10, or the cap 34 and ring 30, from being vertically displaced or pulled vertically from the tube or post 14. The fingers 62 compressed against the tube 14 lock the ring 30 and cap 34 to the tube 14.

As shown in FIGS. 3 and 4, with the cap 34 coupled to the locking ring 30, the ring 30 preferably is completely received within the cap 34, or the open first end 102 of the cap 34. Thus, the locking ring 30 is concealed by the cap 34 from casual observance; as shown in FIG. 2. To the casual observer, the cap 34 will appear coupled to the tube 14 permanently, as there is no visible means of attachment. Any pull on the cap 34 will confirm that the cap 34 is indeed secured to the tube 14, thus discouraging any further tampering. Therefore, the line marker apparatus 10 of the present invention advantageously prevents unauthorized removal by potential vandals because the locking ring 30 is concealed by the cap 34 and secures the cap 34 to the tube 14. In addition, with the edge 86 of the fingers 62 digging into the tube 14, any vertical pulling force on the cap 34 tends to cause the fingers 62 to further dig into the tube 14 and further secure the cap 34 to the tube 14.

In addition, the line marker apparatus 10 of the present invention advantageously is easily removable from the tube 14. Thus, the tube 14 and/or marker 10 may be serviced or replaced. After many years of service it may be necessary to replace the marker or cap 34. In addition, any components located in the tube, or accessed through the tube, may also be serviced or replaced. For example, a valve may be located at the base of the tube 14 and accessed by an elongated wrench after removing the cap. Furthermore, any components located on the tube or under the cap (in the hollow of the cap) may also be serviced or repaired. For example, the tube may convey wires from an underground line to a cathodic protection test station disposed on the tube under the cap.

To remove the line marker apparatus 10 of the present invention from the tube 14, the cap 34 may be rotated in the opposite direction. As the cap 34 rotates with respect to the ring 30, the cap 34 and ring 30 are retracted from one another. In addition, the protrusion 120 is withdrawn from the fingers 62, thus removing the force compressing the fingers 62 against the tube 14. The cap 34 may be completely withdrawn from the ring 30, or may be retracted sufficiently that the protrusion 120 releases the fingers 62 from the tube 14. After the cap 34 is unthreaded and removed from the ring 30, or sufficiently retracted from the ring 30 such that the fingers 62 no longer hold the ring 30 to the tube 14, the ring 30 may be removed from the tube 14. Therefore, the cap 34 may be easily removed, but the method of removal is not readily apparent.

Referring to FIGS. 1, 2 and 5, the cap 34 also has an outer surface 130 As indicated above, the outer surface 130 or cap wall 94 is preferably generally circular or cylindrical to provide a 360 degree view of the marker 10. Indicia 134 may be disposed on the outer surface 130 of the cap 34. The indicia 134 may be warning symbols or words, and/or may be informative symbols or words, and/or may be a highly visible indicator to draw attention to the marker. For example, the indicia may be in bright and contrasting colors to draw attention to the marker, include symbols or words of warning, and/or information about the buried line. The indicia 134 may be directly formed in the material, such as during the injection molding process, printed directly on the outer surface 130, or attached to the outer surface, such as a sticker.

The cap 34 advantageously may have one or more indentations 138 formed in the cap wall 38 or outer surface 130 of the cap 34 for receiving the indicia 134. For example, the indentation 138 may receive a sticker-type indicia 134. The indentation 138 helps prevent the edges of the sticker from peeling off the outer surface 134. The indentations 138 are preferably arc-shaped, like the surface 130, to provide 360 degree visibility. A transparent window 142 may also be disposed in the indentation 138 to further protect the indicia 134. The window 142 may be removably disposed in the indentation 138. The window 142 is preferably arc-shaped to fit in the arc-shaped indentation.

Referring to FIG. 5, the locking ring 30 advantageously may have a slot 140 formed in the outer surface 46 of the ring wall 38 to vent the hollow 98 of the cap 34. The slot extends from the top edge 58 of the wall 38 to the bottom edge 60, as shown in FIG. 1. Alternatively, the locking ring 30 may have a slot 144 formed in the inner surface 54 of the ring wall 38. Alternatively, the cap 34 may have a slot 148 formed in the inner surface 94 of the cap wall 90 and extending into the hollow 98, as shown in FIG. 1.

It is to be understood that the described embodiments of the invention are illustrative only, and that modifications thereof may occur to those skilled in the art. For example, the helical track may be formed on the exterior surface of a shaft or the internal surface of a cavity, while the shaft or cavity may be fixedly coupled to the head or the piston. Accordingly, this invention is not to be regarded as limited to the embodiments disclosed, but is to be limited only as defined by the appended claims herein.

What is claimed is:

1. A line marker comprising:

an elongated tubular member having a first end configured to be inserted into the ground in an area of a utility line, a second end extending upwardly therefrom, and an exterior surface;

a locking ring disposed on the exterior surface of the tubular member and having a longitudinal axis and at least one locking finger extending from the ring, the locking finger being bendable inwardly from the ring and towards the longitudinal axis;

a tubular cap removably coupled to the locking ring, the cap having a cap wall defining a hollow therein, an open end for receiving the locking ring, and a protrusion extending into the hollow of the cap for contacting the locking finger and forcing the locking finger in towards the longitudinal axis; and coupling means for receiving and engaging the locking ring at an interior surface of the cap and in contact with the protrusion for advancing the at least one locking finger; and a slot formed between the cap and the tubular member and extending substantially between the open end of the cap and the hollow in the cap to vent the hollow of the cap.

2. The line marker of claim 1, wherein the coupling means extends within the hollow of the cap to a depth sufficient to enable the locking ring to be completely received within the cap.

3. The line marker of claim 1, wherein the cap wall has an outer surface and an indentation formed in the outer surface of the cap wall for receiving indicia.

4. The line marker of claim 3, further comprising a transparent window disposed in the indentation for protecting the indicia.

5. The line marker of claim 1, wherein the locking ring has a top edge and a bottom edge, and wherein the slot is formed in the wall of the locking ring extending between the top edge and the bottom edge to vent the hollow of the cap.

6. The line marker of claim 1, wherein the slot is formed in the cap wall extending to the hollow of the cap to vent the hollow of the cap.

7. The line marker of claim 1, wherein the at least one finger has an upper end opposite the ring with an interior edge for digging into a surface.

8. The line marker of claim 1, wherein the at least one finger has an inner surface and at least one rib formed on the inner surface of the finger.

9. A line marker comprising:

an elongated tube having a first end configured to be inserted into the ground in an area of a utility line, a second end extending upwardly therefrom, and an exterior surface;

a locking ring disposed on an exterior surface of the tube and having a ring wall with an annular cross-section defining a longitudinal axis, an outer surface with threads formed thereon, and a plurality of locking fingers extending from the ring wall, each locking finger having an outer surface, the fingers being bendable in towards the longitudinal axis; and an elongated cap removably coupled to the locking ring, the cap having a cap wall with an inner surface and a generally annular cross section defining a hollow therein, an enclosed end, and an open end for receiving the locking ring, the inner surface having threads formed thereon engaging the threads of the locking ring and an annular protrusion extending into the hollow of the cap member and contacting the outer surface of the locking fingers for forcing the locking fingers in towards the longitudinal axis, the cap being rotatable about the longitudinal axis with respect to the locking ring to advance and retract the cap on the locking ring along the threads thereof, thus advancing and retracting the annular protrusion along the length of the fingers to bend the fingers in towards the longitudinal axis; and the entire locking ring being completely received within the open end of the cap.

10. The line marker of claim 9, wherein the cap wall has an outer surface and an indentation formed in the outer surface of the cap wall for receiving indicia.

11. The line marker of claim 10, further comprising a transparent window disposed in the indentation for protecting the indicia.

12. The line marker of claim 9, wherein the locking ring has a bottom edge, and wherein the wall of the locking ring has a slot formed therein extending between the top edge and the bottom edge to vent the hollow of the cap.

13. The line marker of claim 9, wherein the cap wall has a slot formed therein extending to the hollow of the cap for venting the hollow of the cap.

14. The line marker of claim 9, wherein the plurality of fingers each have an upper end opposite the ring with an edge for digging into a surface.

15. The line marker of claim 9, wherein at least one of the plurality of fingers has an inner surface and at least one rib formed on the inner surface of the at least one finger generally parallel with the longitudinal axis.

16. A line marker comprising:

an elongated tubular member having a first end configured for insertion into the ground in an area of a utility line, a second end configured for extending upwardly, and a tube wall having an outer surface and an annular cross-section;

a cylindrical locking ring removably disposed near the second end of the tubular member and having a ring wall with an annular cross-section defining a longitudinal axis, an outer surface with threads formed thereon, an inner surface contacting the outer surface of the tubular member, a top edge, and a plurality of resilient locking fingers extending from the top edge of the ring wall toward the second end of the tubular member, each locking finger having an outer surface, an inner surface in contact with the outer surface of the tubular member, and at least one rib formed on the inner surface of at least one of the fingers for preventing rotation of the ring with respect to the tubular member, the fingers being bendable into binding contact with the tubular member; and an elongated cap removably disposed on the second end of the tubular member and removably coupled to the locking ring, the cap having a cap wall with an inner surface and a generally annular cross section defining a hollow therethrough, an enclosed end, and an open end receiving the tubular member and the entire locking ring, the inner surface of the cap having threads formed thereon engaging the threads of the locking ring and an annular protrusion extending into the hollow of the cap and contacting the outer surface of the locking fingers for forcing the locking fingers into contact with the outer surface of the tubular member, the cap being rotatable about the longitudinal axis with respect to the locking ring and tubular member to advance and retract the cap on the locking ring along the threads thereof, thus advancing and retracting the annular protrusion along the length of the fingers to bend the fingers into binding contact with the tubular member.

17. The line marker of claim 16, wherein the cap wall has an outer surface and an indentation formed in the outer surface of the cap wall for receiving indicia.

18. The line marker of claim 17, further comprising a transparent window disposed in the indentation for protecting the indicia.

19. The line marker of claim 16, wherein the locking ring has a bottom edge, and wherein the wall of the locking ring has a slot formed therein extending between the top edge and the bottom edge to vent the hollow of the cap.

20. The line marker of claim 16, wherein the cap wall has a slot formed therein extending to the hollow of the cap to vent the hollow of the cap.

21. The line marker of claim 16, wherein the plurality of fingers each have an upper end opposite the ring with an edge for digging into a surface.

* * * * *